(12) United States Patent
Huang (10) Patent No.: US 10,736,480 B2
(45) Date of Patent: Aug. 11, 2020

(54) AUTOMATIC CHARGING METHOD AND CLEANING ROBOT

(71) Applicant: IBOT Robotic Co. Ltd., Taipei (TW)

(72) Inventor: Chun-Chieh Huang, Taipei (TW)

(73) Assignee: IBOT Robotic Co. Ltd., Taipei (TW)

( * ) Notice: Subject to any disclaimer, the term of this patent is extended or adjusted under 35 U.S.C. 154(b) by 360 days.

(21) Appl. No.: 15/811,692

(22) Filed: Nov. 14, 2017

(65) Prior Publication Data

US 2019/0059677 A1    Feb. 28, 2019

(30) Foreign Application Priority Data

Aug. 30, 2017   (TW) .............................. 106129459 A (51) Int. Cl.
| | |
|---|---|
| *A47L 11/40* | (2006.01) |
| *A47L 9/28* | (2006.01) |
| *A47L 11/24* | (2006.01) |
| *G05D 1/02* | (2020.01) |
| *B25J 9/00* | (2006.01) |

(52) U.S. Cl.
CPC ......... *A47L 11/4011* (2013.01); *A47L 9/2873* (2013.01); *A47L 11/24* (2013.01); *G05D 1/0225* (2013.01); *G05D 1/0234* (2013.01); *A47L 2201/022* (2013.01); *A47L 2201/04* (2013.01);
(Continued)

(58) Field of Classification Search
CPC .................. A47L 11/24; A47L 11/4011; A47L 2201/022; A47L 2201/04; B25J 9/0003; G05D 1/0225; G05D 1/0234; G05D 2201/0203; G05D 2201/0215
See application file for complete search history.

(56) References Cited

U.S. PATENT DOCUMENTS

| 7,567,052 B2 | 7/2009 | Jones et al. |
|---|---|---|
| 7,706,917 B1 | 4/2010 | Chiappetta et al. |
| (Continued) | | |

FOREIGN PATENT DOCUMENTS

| CN | 1284177 | 2/2001 |
|---|---|---|
| TW | 200919210 | 5/2009 |
| (Continued) | | |

OTHER PUBLICATIONS

Office Action of Taiwan Counterpart Application, dated Jul. 26, 2018, pp. 1-6.

*Primary Examiner* — Dale Moyer
(74) *Attorney, Agent, or Firm* — Patterson + Sheridan, LLP (57) ABSTRACT

A cleaning robot including a processor, a first sensor and a second sensor is provided. The first sensor and a second sensor are disposed on one side of a machine body of the cleaning robot. The processor executes a plurality of operation including: when the cleaning robot operated in an automatic charging mode, controlling the cleaning robot to move forward, and determining whether an optical signal transmitted from a charging station is sensed by the first sensor and the second sensor; when the first sensor senses the optical signal, determining the cleaning robot is located in the light emission range of the optical signal; when the second sensor senses the optical signal, determining the one side of the cleaning robot faces a charging station; controlling the cleaning robot to move forward, so that the power receiving portion of the cleaning robot contacts a power supply portion of the charging station.

16 Claims, 7 Drawing Sheets

(52) U.S. Cl.
CPC ..... *B25J 9/0003* (2013.01); *G05D 2201/0203* (2013.01); *G05D 2201/0215* (2013.01)

(56) References Cited

U.S. PATENT DOCUMENTS

| | | | |
|---|---|---|---|
| 8,380,350 | B2 | 2/2013 | Ozick et al. |
| 8,972,060 | B2 | 3/2015 | Teng et al. |
| 9,014,885 | B2 | 4/2015 | Barnes et al. |
| 9,149,170 | B2 | 10/2015 | Ozick et al. |
| 2005/0231156 | A1* | 10/2005 | Yan ................. G05D 1/0225 320/107 |
| 2006/0087273 | A1* | 4/2006 | Ko ..................... A47L 9/009 318/568.12 |
| 2007/0050086 | A1* | 3/2007 | Lim ................. G05D 1/0225 700/245 |
| 2007/0244610 | A1* | 10/2007 | Ozick ............... A47L 9/0411 701/23 |
| 2008/0012518 | A1* | 1/2008 | Yamamoto ........ G05D 1/0225 318/568.12 |
| 2011/0295447 | A1* | 12/2011 | Hung ................ A47L 9/2805 701/2 |
| 2013/0218341 | A1 | 8/2013 | Teng et al. |
| 2013/0218342 | A1* | 8/2013 | Teng ................. G05D 1/0231 700/259 |

FOREIGN PATENT DOCUMENTS

| | | |
|---|---|---|
| TW | 201142562 | 12/2011 |
| TW | 201334750 | 9/2013 |
| TW | 201335728 | 9/2013 |
| TW | I481375 | 4/2015 |

\* cited by examiner

FIG. 7E

AUTOMATIC CHARGING METHOD AND CLEANING ROBOT

CROSS-REFERENCE TO RELATED APPLICATION

This application claims the priority benefit of Taiwan application serial no. 106129459, filed on Aug. 30, 2017. The entirety of the above-mentioned patent application is hereby incorporated by reference herein and made a part of this specification.

BACKGROUND OF THE INVENTION

Field of the Invention

The invention is related to a charging method, and particularly to an automatic charging method and a cleaning robot adapted for the automatic charging method.

Description of Related Art

In the technical field of cleaning robot, there are increasing search and designs regarding how to design cleaning robots with automatic charging function so as to improve utility performance of the cleaning robot. However, if the cleaning robot is unable to make machine body to return to the position of charging station via an effective moving path, the capability of long-term operation of the cleaning robot is affected, even the cleaning effect is likely to be decreased. Accordingly, the invention provides a solution with several embodiments to address the issue of how to design the cleaning robot to move toward the charging station effectively so that a power receiving portion of the cleaning robot can be practically and electrically in contact with a power supply portion of the charging station, thereby effectively charging a battery unit of the cleaning robot.

SUMMARY OF THE INVENTION

The invention provides an automatic charging method and a cleaning robot which are capable of effectively determining the position of charging station and moving toward the charging station accurately so that the cleaning robot can receive the power supplied by the charging station, thereby performing charging operation on the battery unit.

In the invention, an automatic charging method is adapted for a cleaning robot. A first sensor and a second sensor are disposed on one side of a machine body of the cleaning robot. The method includes: when the cleaning robot is operated in an automatic charging mode, controlling the machine body to move forward, and determining whether an optical signal transmitted from a charging station is sensed by the first sensor; when the first sensor senses the optical signal, determining that the machine body is in a light emission range of the optical signal and continuously controlling the machine body to move forward; when the first sensor stops sensing the optical signal, determining that the machine body is at an edge of the light emission range of the optical signal, and stop controlling the machine body to move forward; controlling the machine body to rotate along a first rotation direction so that the first sensor senses the optical signal again to determine that the machine body returns to the light emission range of the optical signal, and determining whether the optical signal is sensed via the second sensor; when the second sensor senses the optical signal, stopping controlling the machine body to rotate along the first rotation direction, and determining that the one side of the machine body faces the charging station; and controlling the machine body to move forward so that the machine body moves toward the charging station, when the power receiving portion of the machine body is in contact with the power supply portion of the charging station, stopping controlling the machine body and performing charging operation.

In the invention, a cleaning robot includes a processor, a first sensor and a second sensor. The processor is disposed within the machine body. The first sensor and the second sensor are coupled to the processor, and disposed on one side of the machine body. When the cleaning robot is operated in an automatic charging mode, the processor performs a plurality of operations including: controlling the machine body to move forward, and determining whether an optical signal transmitted from a charging station is sensed via the first sensor; when the first sensor senses the optical signal, determining that the machine body is in the light emission range of the optical signal, and continuously controlling the machine body to move forward; when the first sensor stops sensing the optical signal, determining that the machine body is at an edge of the light mission range of the optical signal, and stopping controlling the machine body to move forward; controlling the machine body to rotate along a first rotation direction so that the first sensor senses the optical signal again so as to determine that the machine body returns to the light emission range of the optical signal, and determining whether the optical signal is sensed via the second sensor; when the second sensor senses the optical signal, stopping controlling the machine body to rotate along the first rotation direction, and determining that the one side of the machine body faces the charging station; and controlling the machine body to move forward so that the machine body moves toward the charging station, when the power receiving portion of the machine body is in contact with the power supply portion of the charging station, stopping controlling the machine body.

In summary, in the invention, the automatic charging method and the cleaning robot make it possible that the position of the charging station can be sensed via the first sensor and the second sensor, and the position of the machine body of the cleaning robot can be moved according to the sensing result of the first sensor and the second sensor, such that the power receiving portion of the machine body of the cleaning robot faces the charging station accurately while the machine body of the cleaning robot is controlled to move toward the charging station. Accordingly, the power receiving portion of the cleaning robot of the invention can be electrically connected with the power supply portion of the charging station accurately, and thus the battery unit of the cleaning robot is charged via the power supplied by the charging station.

In order to make the aforementioned features and advantages of the invention more comprehensible, embodiments accompanying figures are described in detail below.

DESCRIPTION OF EMBODIMENTS

Several embodiments are provided below to describe the disclosure; however, the disclosure should not be limited to the embodiments given herein. The embodiments described below can be combined with each other if deemed proper. Wherever possible, the same reference numbers are used in the drawings and the description to refer to the same or like parts.

Figure 1:
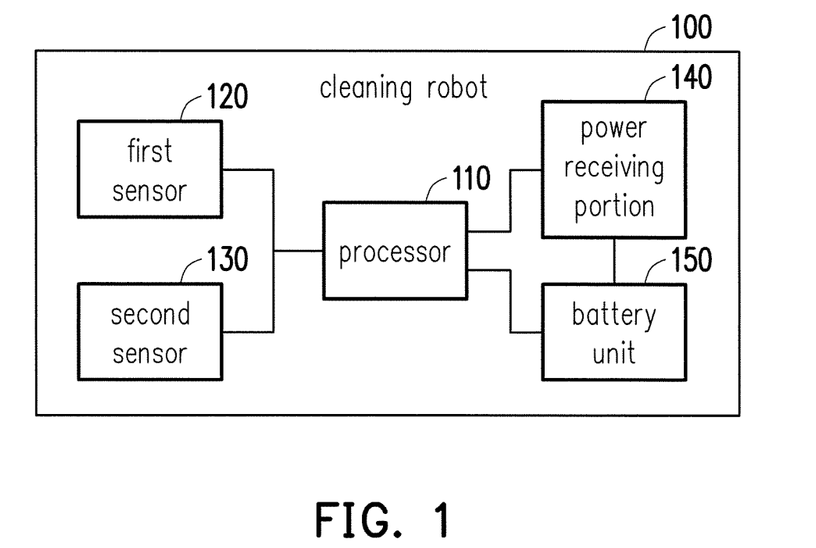
FIG. 1 is a block view illustrating a cleaning robot according to an embodiment of the invention.

FIG. 1 is a block view illustrating a cleaning robot according to an embodiment of the invention. Referring to FIG. 1, in the embodiment, a cleaning robot 100 includes a processor 110, a first sensor 120, a second sensor 130, a power receiving portion 140 and a battery unit 150. The processor 110 is coupled to the first sensor 120, the second sensor 130, the power receiving portion 140 and the battery unit 150, and the power receiving portion 140 is coupled to the battery unit 150. In the embodiment, a cleaning robot 100 is a self-propelled movable device and has an automatic cleaning mode and an automatic charging mode.

In the embodiment, a machine body of the cleaning robot 100 may further include a cleaning mode and a power module. The processor 110 can drive and control the power module and the cleaning module to perform corresponding cleaning work as well as relative moving and rotating operations of the machine body described in the embodiments of the invention. In the embodiment, when the cleaning robot 100 is operated in the automatic cleaning mode, the machine body of the cleaning robot 100 can walk on the floor via the power module and performs floor cleaning work via the cleaning module. For example, the power module may include a motor and rollers and so on. The power module may drive the rollers via the power supplied by the battery unit 150 so that the machine body of the cleaning robot 100 moves on the floor. Meanwhile, the power module may also drive the cleaning module so that the cleaning tool of the cleaning module can perform cleaning actions such as rotation and swinging. However, sufficient teaching, suggestions and implementations regarding the detailed technical features of the cleaning module and power module described in the embodiment can be derived from ordinary knowledge of the field; therefore, no further descriptions are incorporated herein.

In the embodiment, the power receiving portion 140 of the cleaning robot 100 may receive charging voltage by contacting the power supply portion of the charging station so as to charge the battery unit 150. In the embodiment, when the cleaning robot 100 is operated in the automatic charging mode, the cleaning robot 100 may take a predetermined walking route to search for the position of the charging station, wherein the predetermined walking route may be, for example, a walking route along the wall or a returning route along the original route, the invention provides no limitation thereto. When the cleaning robot 100 takes the predetermined walking route, the cleaning robot 100 may determine whether the optical signal transmitted from the charging station is sensed via the first sensor 120 and the second sensor 130 so as to further move the machine body of the cleaning robot 100 to move toward the charging station.

In the embodiment, the processor 110 may be, for example, a central processing unit (CPU), a micro-processor unit (MPU) or a micro control unit (MCU) and so on, the invention provides no limitation thereto. Meanwhile, the cleaning robot 100 may further include a memory unit, wherein the memory unit may be used for storing a plurality of modules to be read and executed by the processor 110. In the embodiment, the processor 110 may realize the automatic charging method described in the embodiments of the invention via executing a program of software or a logical circuit of hardware.

In the embodiment, the first sensor 120 and the second sensor 130 may be an infrared (IR) sensor, and the charging station includes a light emitter, wherein the light emitter may be, for example, an IR light emitter. In the embodiment, the cleaning robot 100 may determine whether the cleaning robot 100 performs the next moving operation according to whether the first sensor 120 and the second sensor 130 sense an IR signal transmitted by the light emitter of the charging station such that the machine body of the cleaning robot 100 moves toward the charging station. However, the implementation details of the moving operation are incorporated in the embodiments of FIG. 6 to FIG. 7E below.

In the embodiment, the battery unit 150 may be a chargeable battery such as a lithium battery, a nickel-hydrogen battery and so on. The battery unit 150 may provide power to each element of the cleaning robot 100 and perform charging operation via the power receiving portion 140. In the embodiment, the cleaning robot 100 may sense whether the battery capacity of the battery unit 150 is lower than a predetermined battery capacity to determine whether to enter the automatic charging mode or not. However, the predetermined battery capacity of the embodiment may be designed in corresponding to the type of battery unit, level of power consumption of the cleaning robot 100 or the user's requirement. For example, in an embodiment, the predetermined battery capacity may be, for example, 10%, 15% or 20% of the total battery capacity of the battery unit 150.

Figure 2:
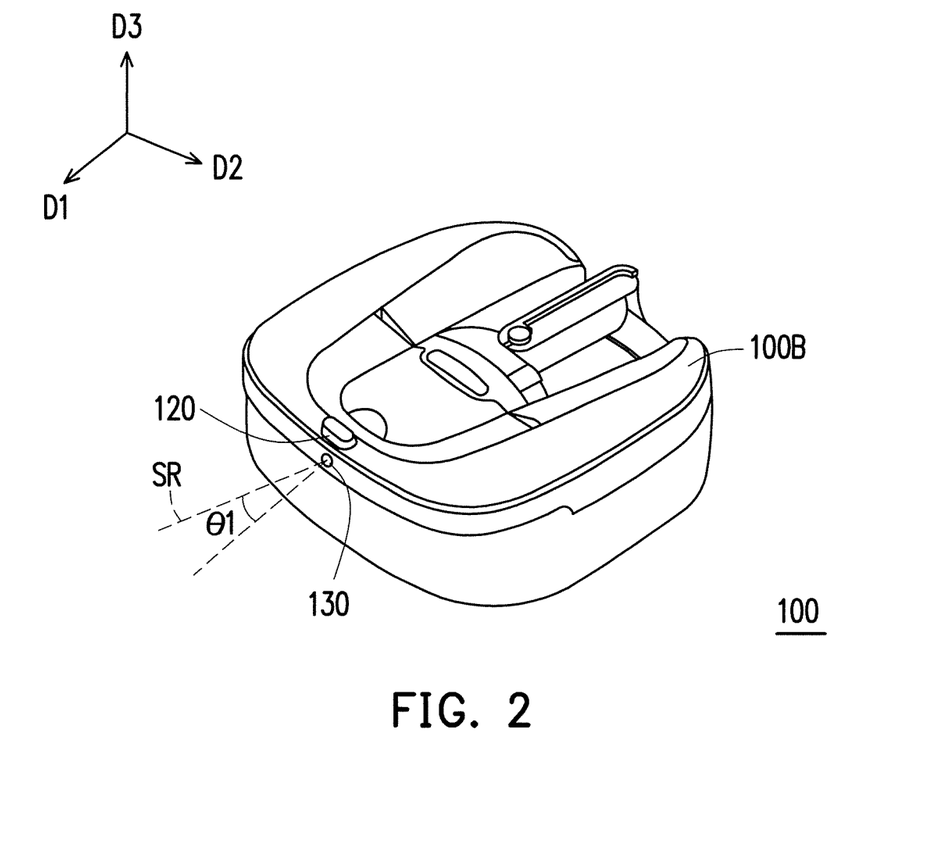
FIG. 2 is a schematic view illustrating a cleaning robot according to an embodiment of the invention.

FIG. 2 is a schematic view illustrating a cleaning robot according to an embodiment of the invention. Referring to FIG. 2, a machine body 100B of the cleaning robot 100 may be as shown in FIG. 2, wherein a first direction D1, a second direction D2 and a third direction D3 are perpendicular to each other. In the embodiment, the cleaning robot 100 may walk on a plane constructed by the first direction D1 and the second direction D2. The plane constructed by the first direction D1 and the second direction D2 may be a floor. In the embodiment, the first sensor 120 and the second sensor 130 are disposed on one side of the machine body 100B, wherein the one side may refer to a front side (see FIG. 2) of the machine body 100B of the cleaning robot 100, the invention provides no limitation thereto. In an embodiment, the first sensor 120 and the second sensor 130 may be disposed on the rear side of the machine body 100B. In the embodiment, the first sensor 120 is an omni-directional optical sensor, and the second sensor 130 is a directional optical sensor. Specifically, in the embodiment, the first sensor 120 and the second sensor 130 may be disposed in sequence along the first direction D1 on the front side of the machine body 100B. The processor 110 drives the power module of the cleaning robot 100 such that the machine body 100B moves forward along the first direction D1.

In the embodiment, viewing from a top view of the floor, a light receiving angle θ1 of a light receiving range SR of the second sensor 130 may be, for example, 10 degrees, 15 degrees, 20 degrees or 30 degrees and so on, which should not be construed as a limitation to the invention. Specifically, the first sensor 120 and the second sensor 130 may be disposed on the front side of the machine body 100B. Accordingly, in the moving process of the machine body 100B, the cleaning robot 100 may sense the optical signal transmitted from the charging station via the first sensor 120 and the second sensor 130.

However, the first sensor 120 and the second sensor 130 of the invention are not limited to be disposed on the front side of the machine body 100B. In an embodiment, the first sensor 120 and the second sensor 130 may be disposed on the rear side of the machine body 100B, or respectively disposed at different positions of the machine body 100B. In another embodiment, the first sensor 120 and the second sensor 130 may be disposed at positions at the same or different levels of height of the machine body 100B, the invention provides no limitation thereto.

In addition, in the embodiment, the power receiving portion of the cleaning robot 100 may be disposed at the bottom (opposite to the third direction D3) of the machine body 100B, or disposed on the same side of the second sensor 130, which should not be construed as a limitation to the invention. In the embodiment, the power receiving portion of the cleaning robot 100 may include positive and negative electrode ends, which are in contact with the positive and negative electrode ends of the charging station such that the power receiving portion of the cleaning robot 100 is electrically connected with the power supply portion of the charging station.

Moreover, in the embodiment, the first direction D1, the second direction D2 and the third direction D3 in FIG. 2 only serve to describe the relative configuration relationship between the first sensor 120 and the second sensor 130 on the machine body 100B, and the placing and moving methods of the cleaning robot 100 of the invention are not limited thereto. Also, the appearance and shape of the machine body 100B of the cleaning robot 100 of the invention is not limited to the illustration in FIG. 2.

Figure 3:
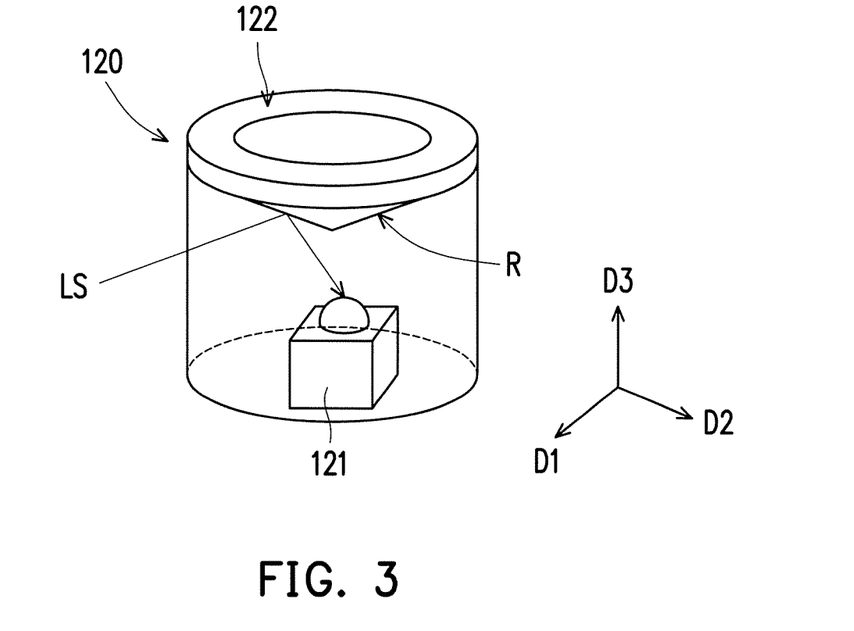
FIG. 3 is a schematic view illustrating a first sensor according to an embodiment of the invention.

FIG. 3 is a schematic view illustrating a first sensor according to an embodiment of the invention. Referring to FIG. 3, in the embodiment, the first sensor 120 of the cleaning robot 100 is an omni-directional optical sensor. The first sensor 120 includes a light receiver 121 and a reflective structure 122. The light receiver 121 and the reflective structure 122 are disposed perpendicularly along the third direction D3. In the embodiment, the reflective structure 122 may be cone-shaped as shown in FIG. 3, and includes a reflective surface R. In other words, the light receiver 121 of the first sensor 120 may receive the optical signal LS reflected by the reflective surface R of the reflective structure 122 such that the first sensor 120 senses the optical signal LS about the third direction D3 as an axle center in an arbitrary direction of the plane formed by the first direction D1 and the second direction D2. In addition, the first direction D1, the second direction D2 and the third direction D3 shown in FIG. 3 only serve to illustrate the relative configuration relationship between each element of the first sensor 120, and the placing and moving methods of the cleaning robot 100 of the invention are not limited thereto.

Figure 4:
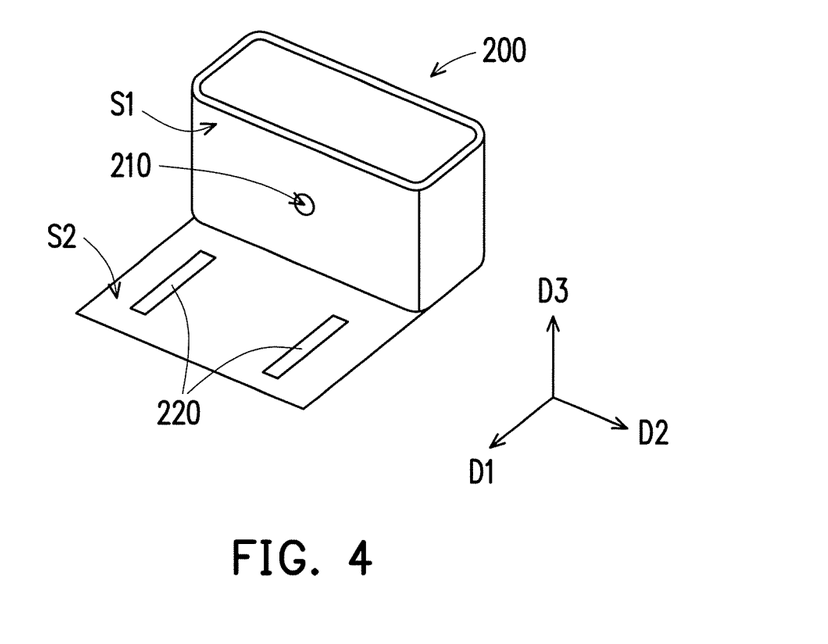
FIG. 4 is a schematic view illustrating a charging station according to an embodiment of the invention.

FIG. 4 is a schematic view illustrating a charging station according to an embodiment of the invention. Referring to FIG. 4, in the embodiment, a charging station 200 may be, for example, disposed on a wall surface formed by the second direction D2 and the third direction D3. The charging station 200 includes a light emitter 210 and a power supply portion 220. In the embodiment, the light emitter 210 is disposed on a surface S1 of the charging station 200, and the power supply portion 220 is disposed on a surface S2 of the charging station 200. The surface S1 may face the first direction D1, and the surface S2 may face the third direction D3. Therefore, the light emitter 210 may transmit the optical signal toward the first direction D1. Meanwhile, when the cleaning robot moves toward the charging station 200, the power receiving portion at the bottom of the cleaning robot may be in contact with the power supply portion 220 of the charging station 200 along the third direction D3 so as to perform charging operation.

Figure 5:
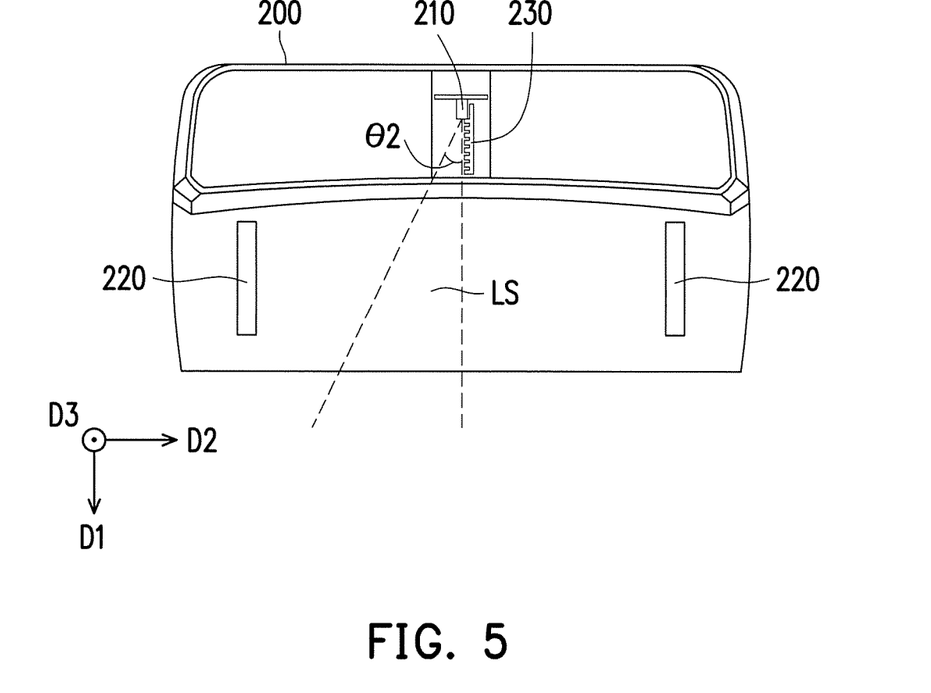
FIG. 5 is a top cross-sectional view of the charging station according to the embodiment of FIG. 4.

FIG. 5 is a top cross-sectional view of the charging station according to the embodiment in FIG. 4. Referring to FIG. 4 and FIG. 5, in the embodiment, the light emitter 210 may be disposed within the charging station 200 and transmits the optical signal LS via a transmission hole. In the embodiment, the charging station 200 further includes a blocking structure 230. The blocking structure 230 blocks a portion of the light emission range of the light emitter 210 such that the light emitter 210 transmits another portion of the optical signal LS at a light emission angle θ2. In other words, initially the light emitter 210 has double of light emission angle θ2. Since the blocking structure 230 blocks half of the light emission range of the light emitter 210, one of the boundary of the light emission range of the light emitter 210 is perpendicular to the wall surface, which should not be construed as a limitation to the invention. In an embodiment, the light emission range of the light emitter 210 may be determined according to the shape or configuration position of the blocking structure 230.

In the embodiment, the blocking structure 230 may have a periodic changing structure along the emitting direction (first direction D1) of the light emitter 210. In the embodiment, the periodic changing structure of the blocking structure 230 may effectively block a portion of the optical signal LS transmitted by the light emitter 210 such that the light emission range of the light emitter 210 can be effectively reduced via the configuration position of the blocking structure 230, so that the light emission range of the light emitter 210 may be effectively formed into a shape of a vertical triangle. That is to say, for the light emitter 210 of the charging station 200, with the blocking structure having the periodic changing structure that blocks the portion of the light emission range of the optical signal, one boundary of the light emission range of the optical signal LS transmitted by the light emitter 210 can be nearly parallel with the first direction D1.

Figure 6:
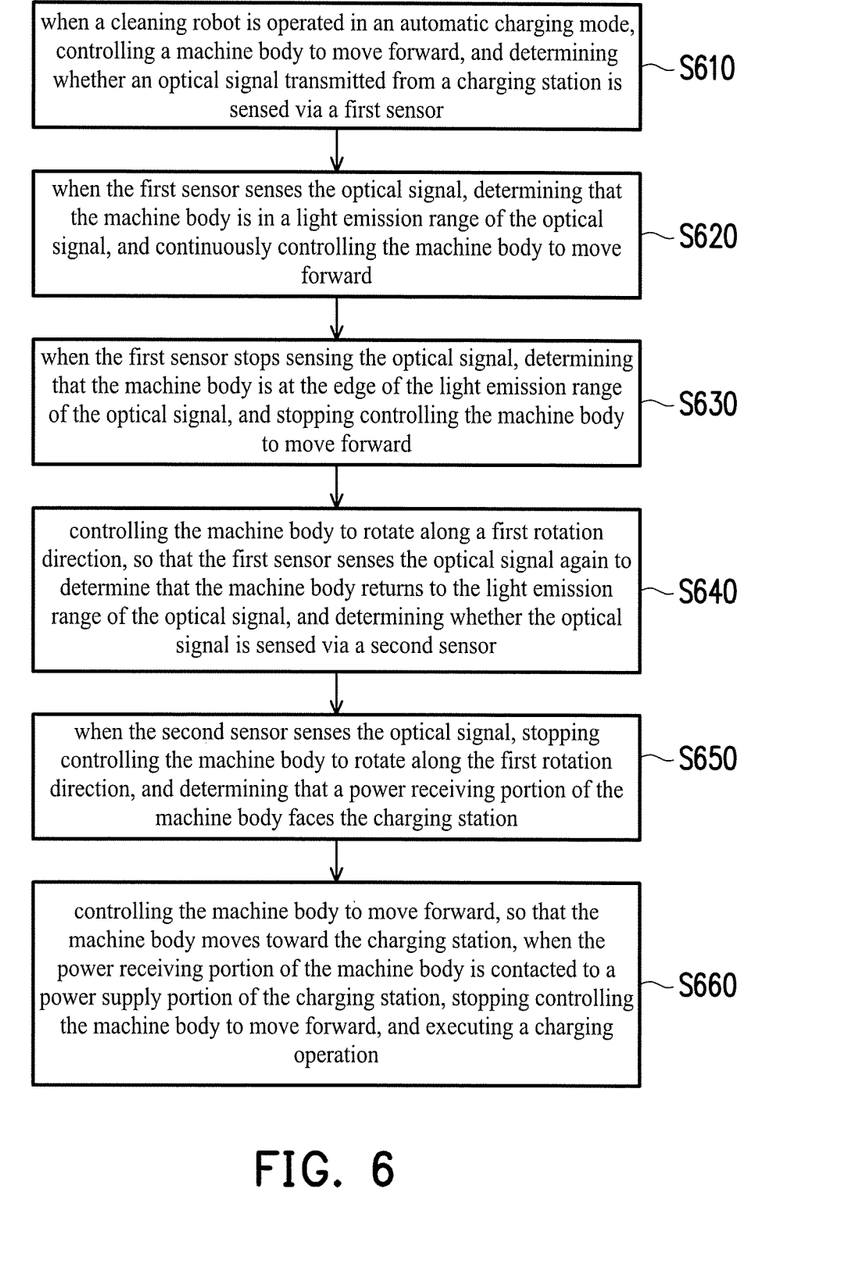
FIG. 6 is a flowchart of an automatic charging method according to an embodiment of the invention.
Figure 7A:
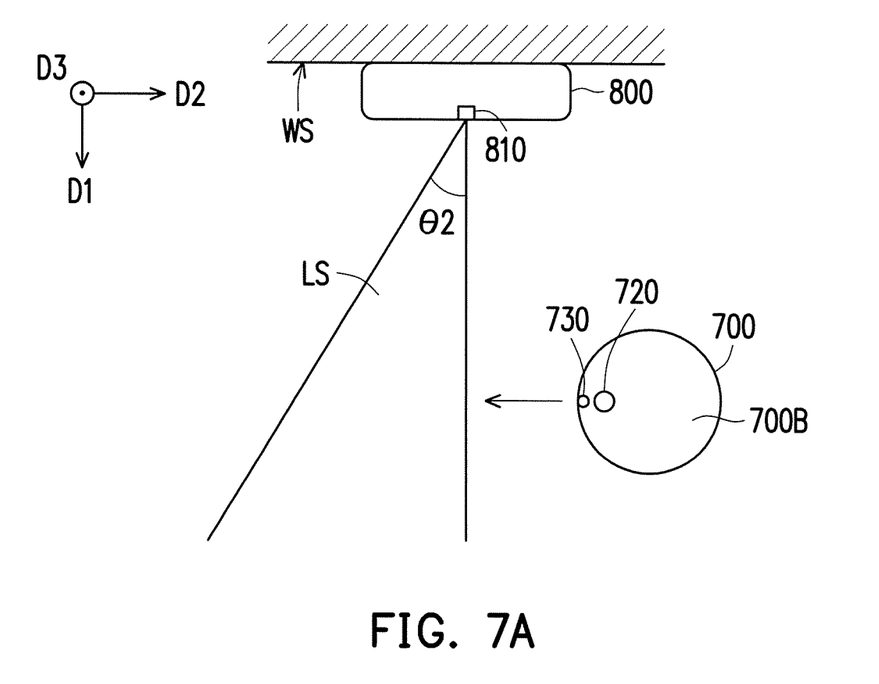
FIG. 7A to FIG. 7E are schematic views illustrating a cleaning robot performing an automatic charging method according to an embodiment of the invention.

FIG. 6 is a flowchart of an automatic charging method according to an embodiment of the invention. FIG. 7A to FIG. 7E are schematic views illustrating a cleaning robot performing an automatic charging method according to an embodiment of the invention. Referring to FIG. 6 to FIG. 7E, the automatic charging method in the embodiment may be adapted for a cleaning robot 700 in the embodiments illustrated in FIG. 7A to FIG. 7E. In the embodiment, a charging station 800 may be, for example, disposed on a wall surface WS formed by the second direction D2 and the third direction D3, and a light emitter 810 of the charging station 800 transmits the optical signal LS toward the first direction D1. In the embodiment, since the portion of the light emission range of the light emitter 810 is blocked by the blocking structure, the light emission range of the optical signal LS is as shown in FIG. 7A to FIG. 7E. In the embodiment, the light emitter 810 has a light emitter angle θ2, and one of the boundary of the light emission range of the optical signal LS may be perpendicular to the wall surface WS where the charging station 800 is disposed.

In the following exemplary embodiment, assuming that the cleaning robot 700 walks along the wall, and moves toward a direction opposite to the second direction D2. Referring to FIG. 7A, in step S610, when the cleaning robot 700 is operated in the automatic charging mode, the processor of the cleaning robot 700 controls the machine body 700B to move forward, and determines whether the optical signal LS transmitted from the charging station 800 is sensed via the first sensor 720.

Figure 7B:
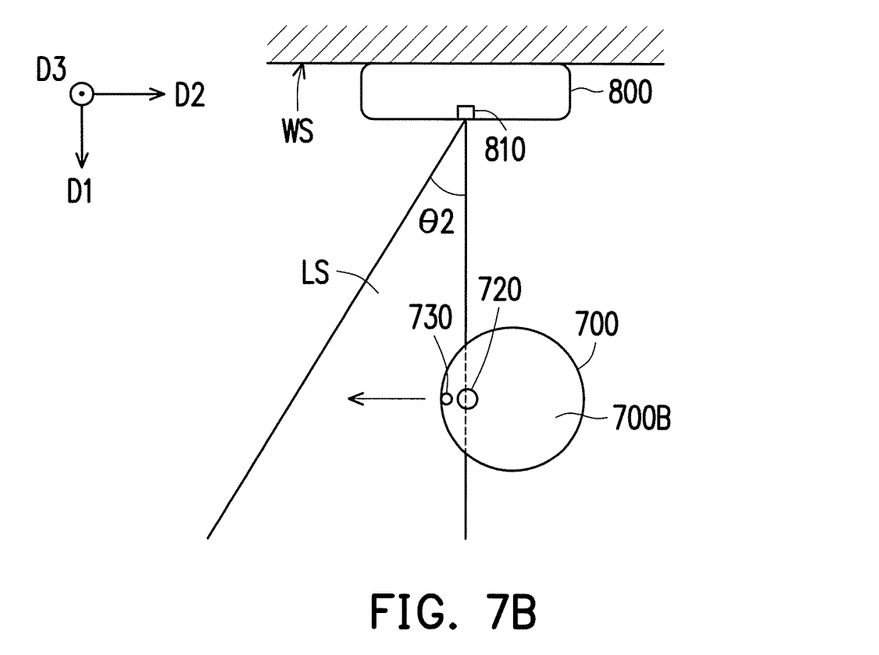

Referring to FIG. 7B, in step S620, when the first sensor 720 of the cleaning robot 700 senses the optical signal LS, the processor of the cleaning robot 700 determines that the machine body 700B is in the light emission range of the optical signal LS, and continuously controls the machine body 700B to move forward. Meanwhile, in the same step, when the first sensor 720 of the cleaning robot 700 senses the optical signal LS, the processor of the cleaning robot 700 may reduce the moving speed of the machine body 700B so as to effectively avoid that the moving speed of the cleaning robot 700 is too fast and causes the sensing accuracy of the first sensor 720 to be reduced.

Figure 7C:
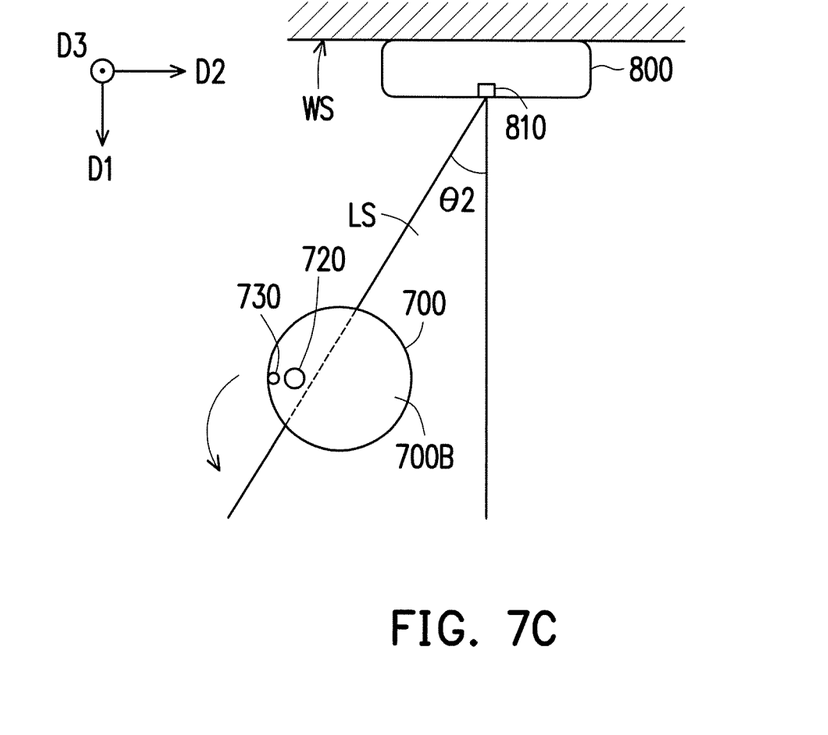
Figure 7D:
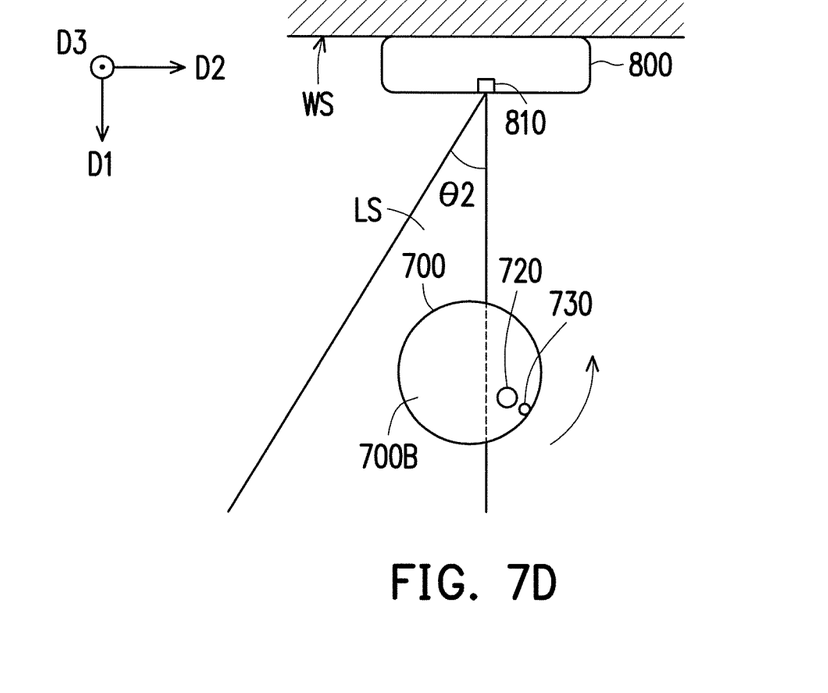
Figure 7E:
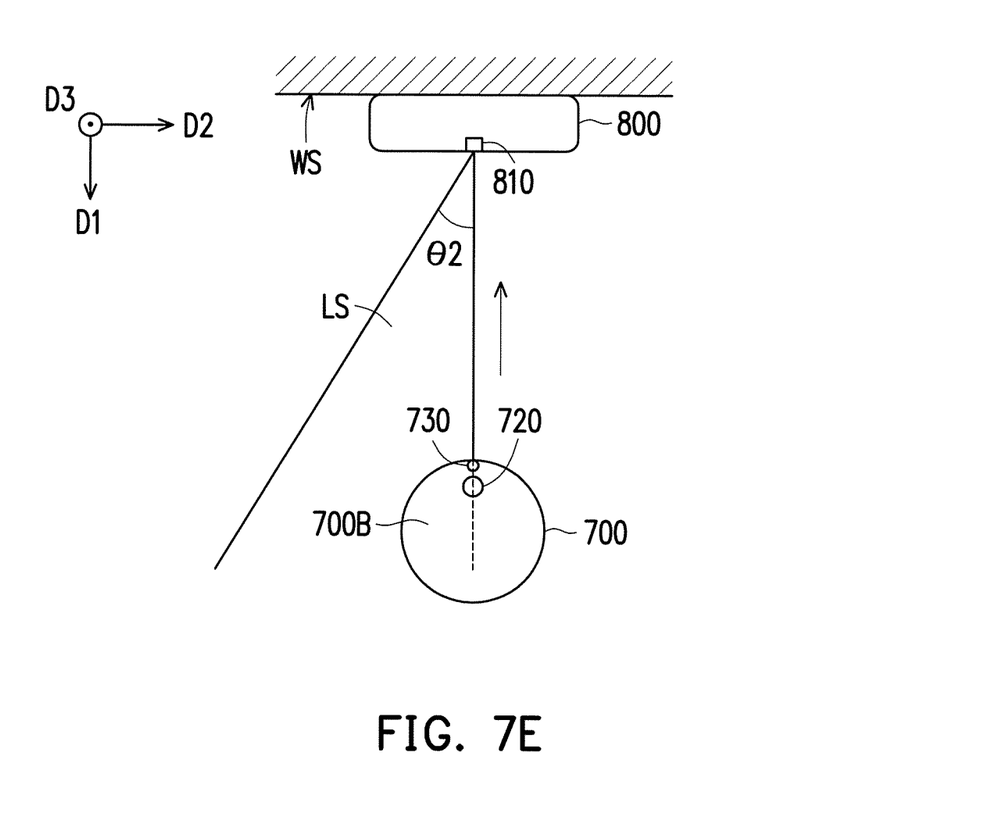

Referring to FIG. 7C and FIG. 7D, in step S630, when the first sensor 720 stops sensing the optical signal LS, the processor of the cleaning robot 700 determines that the machine body 700B is at the edge of the light emission range of the optical signal LS, and stops controlling the machine body 700B to move forward. In step S640, the processor of the cleaning robot 700 controls the machine body 700B to rotate along the first rotation direction so that the first sensor 720 senses the optical signal again to determine that the machine body 700B returns to the light emission range of the optical signal LS. In the meantime, the processor of the cleaning robot 700 determines whether the optical signal LS is sensed via the second sensor 730. In the same step, the first rotation direction is, for example, rotation to the left, which should not be construed as a limitation to the invention. In other embodiment, the first rotation direction may also be, for example, rotation to the right. The first rotation direction described in the embodiments of the invention may be determined according to the relationship between the relative positions of the cleaning robot 700 and charging station 800.

In an embodiment, when the cleaning robot 700 performs step S640, when the first sensor 720 stops sensing the optical signal LS again, the processor of the cleaning robot 700 determines that the machine body 700B is at another edge of the light emission range of the optical signal LS, and continuously controls the machine body 700B to rotate along the first rotation direction, such that the first sensor 720 senses the optical signal LS again. Meanwhile, when the first sensor 720 senses the optical signal LS again, the processor of the cleaning robot 700 determines that the machine body 700B returns to the light emission range of the optical signal LS, and continuously controls the machine body 700B to rotate along the first rotation direction so as to determine whether the optical signal LS is sensed via the second sensor 730. However, in the rotating process of the machine body 700B, if the first sensor 720 and the second sensor 730 sense the optical signal LS at the same time, the processor of the cleaning robot 700 directly determines that the power receiving portion of the machine body 700B faces the charging station 800, or directly determines that the one side of the machine body 700B where the first sensor 720 and the second sensor 730 are disposed faces the charging station 800. Then the processor of the cleaning robot 700 directly carries out step S660.

Referring to FIG. 7E, in step S650, when the second sensor 730 senses the optical signal LS, the processor of the cleaning robot 700 stops controlling the machine body 700B to rotate along the first rotation direction, and determines that the power receiving portion of the machine body 700B faces the charging station 800, or determines that the one side of the machine body 700B where the first sensor 720 and the second sensor 730 are disposed faces the charging station 800. In step S660, the processor of the cleaning robot 700 controls the machine body 700B to move forward so that the machine body 700B moves toward the charging station 800. When the power receiving portion of the machine body 700B is in contact with the power supply portion of the charging station 800, the operation of controlling the machine body 700B is stopped, and the processor of the cleaning robot 700 carries out charging operation.

In an embodiment, when the cleaning robot 700 carries out step S660, if the second sensor 730 stops sensing the optical signal LS, then the processor of the cleaning robot 700 stops controlling the machine body 700B to move forward, and controls the machine body 700B to rotate to the left and right so as to adjust the moving direction along which the machine body 700B moves toward the charging station 800.

Furthermore, when the second sensor 730 senses the optical signal LS again, the processor of the cleaning robot 700 continuously controls the machine body 700B to move forward. That is to say, in the process that the machine body 700B of the cleaning robot 700 moves toward the charging station 800, if the second sensor 730 continuously senses the optical signal LS, it represents that the machine body 700B moves in a direction toward the charging station 800. On the other hand, in the process that machine body 700B of the cleaning robot 700 moves toward the charging station 800, if the second sensor 730 stops sensing the optical signal LS, it represents that the moving direction of the machine body 700B is shifted. Therefore, in an embodiment, the machine body 700B of the cleaning robot 700 may stop moving forward first, and the machine body 700B is rotated to the right and left so that the second sensor 730 can sense the optical signal LS again to adjust the moving direction for the machine body 700B to move toward the charging station 800. However, in another embodiment, if the second sensor 730 cannot re-sense the optical signal LS, then the processor of the cleaning robot 700 performs the automatic charging operation again so as to utilize the first sensor 720 and the second sensor 730 again to search for the position of the charging station 800.

In addition, it should be mentioned that, in the above-mentioned steps, the rotating method of the machine body 700B may refer to that the machine body 700B moves in a curved movement, or refer to that the machine body 700B rotates in situ about the body as an axle center. The rotating method of the machine body 700B of the invention may be determined depending on the circumstances of the machine body 700B or set according to the designer's choice. For example, in the above-mentioned implementation where the machine body 700B rotates along the first rotation direction, the "rotation" may refer to that the machine body 700B moves and rotates in a curved movement manner. However, in step S660, when the machine body 700B moves toward the charging station 800 and the moving direction is shifted, in the implementation that the cleaning robot 700 rotates the machine body 700B to the left and right, the "rotation" refers to that the machine body 700B rotates in situ to the left and right about the body as an axle center so as to slightly adjust the direction along which the machine body 700B moves ahead.

Accordingly, based on the above-mentioned steps S610 to S660, the automatic charging method in the embodiment allows the cleaning robot 700 to effectively search for the position of the charging station and performs automatic charging operation. However, in an embodiment, the cleaning robot 700 may also move along the second direction D2, and senses the position of the charging station 800 via the first sensor 720 and the second sensor 730, which is not limited to the illustration in FIG. 7A to FIG. 7E. In other words, the cleaning robot 700 of the invention may, for example, move toward the wall surface first so that the machine body 700B walks along the wall surface in an arbitrary direction at a predetermined distance away from the wall surface, and accurately moves toward the charging station 800 based on the process of the automatic charging method illustrated in FIG. 6 so as to perform charging operation effectively.

Moreover, sufficient teaching, suggestions and implementations regarding detailed configuration and features of the cleaning robot 700 and charging station 800 of the embodiment may be derived from the descriptions in the embodiments of FIG. 1 to FIG. 5; therefore, no further descriptions are incorporated herein.

In summary, according to the invention, the automatic charging method and cleaning robot can sense the optical signal transmitted from the charging station via the directional optical sensor and omni-directional optical sensor respectively so as for the cleaning robot to accurately determine the position of the charging station. Meanwhile, the light emitter of the charging station of the invention can effectively block a portion of the light emission range of the optical signal via the blocking structure having the periodic changing structure so that the light emission range of the optical signal transmitted by the light emitter can be restricted effectively, which helps the cleaning robot to move toward the charging station accurately. In this manner, the cleaning robot of the invention can provide the effective automatic charging function.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. An automatic charging method, adapted for a cleaning robot, and a first sensor and a second sensor disposed on a side of a machine body of the cleaning robot, comprising:
   when the cleaning robot is operated in an automatic charging mode, controlling the machine body to move forward, and determining whether an optical signal transmitted from a charging station is sensed via the first sensor;
   when the first sensor senses the optical signal, determining that the machine body is in a light emission range of the optical signal, and continuously controlling the machine body to move forward;
   when the first sensor stops sensing the optical signal, determining that the machine body is at an edge of the light emission range of the optical signal, and stops controlling the machine body to move forward;
   controlling the machine body to move along a first rotation direction, so that the first sensor senses the optical signal again to determine that the machine body returns to the light emission range of the optical signal, and determining whether the optical signal is sensed via the second sensor;
   when the second sensor senses the optical signal, stopping controlling the machine body to rotate along the first rotation direction and determining that the one side of the machine body faces the charging station; and
   controlling the machine body to move forward, so that the machine body moves toward the charging station, when a power receiving portion of the machine body is in contact with a power supply portion of the charging station, stopping controlling the machine body to move forward and perform a charging operation, wherein
   the charging station comprises a light emitter and a blocking structure; and
   the blocking structure comprises a periodic changing structure in a transmitting direction of the light emitter.

2. The automatic charging method according to claim 1, wherein when the first sensor senses the optical signal, the step of determining that the machine body is in the light emission range of the optical signal, and continuously controlling the machine body to move forward comprises:
   when the machine body is in the light emission range of the optical signal, reducing a moving speed of the machine body.

3. The automatic charging method according to claim 1, wherein the step of controlling the machine body to rotate along the first rotation direction, so that the first sensor senses the optical signal again to determine that the machine body returns to the light emission range of the optical signal comprises:
   when the first sensor stops sensing the optical signal again, determining that the machine body is at another edge of the light emission range of the optical signal, and continuously controlling the machine body to rotate along the first rotation direction, so that the first sensor senses the optical signal again; and
   when the first sensor senses the optical signal again, determining that the machine body returns to the light emission range of the optical signal, and continuously controlling the machine body to rotate along the first rotation direction so as to determine whether the optical signal is sensed via the second sensor.

4. The automatic charging method according to claim 1, wherein the step of controlling the machine body to move forward, so that the machine body moves toward the charging station comprises:
   when the second sensor stops sensing the optical signal, stopping controlling the machine body to move forward, and controlling the machine body to rotate to the left and right so as to adjust a moving direction along which the machine body moves toward the charging station; and
   when the second sensor senses the optical signal again, continuously controlling the machine body to move forward.

5. The automatic charging method according to claim 1, wherein the first sensor is an omni-directional optical sensor and the second sensor is a directional optical sensor.

6. The automatic charging method according to claim 1, wherein the first sensor comprises a reflective structure, and the first sensor receives the optical signal reflected via the reflective structure.

7. The automatic charging method according to claim 1, wherein the blocking structure blocks a portion of a light emission range of the light emitter, so that the light emitter transmits the optical signal via another portion of the light emission range.

8. A cleaning robot, comprising:
a processor, disposed within a machine body; and
a first sensor and a second sensor, coupled to the processor, and disposed at a side of the machine body, wherein when the cleaning robot is operated in an automatic charging mode, the processor performs a plurality of operations comprising:
controlling the machine body to move forward, and determining whether an optical signal transmitted from a charging station is sensed via the first sensor, wherein the charging station comprises a light emitter and a blocking structure, and the blocking structure comprises a periodic changing structure along a transmitting direction of the light emitter;
when the first sensor senses the optical signal, determining that the machine body is in a light emission range of the optical signal, and continuously controlling the machine body to move forward;
when the first sensor stops sensing the optical signal, determining that the machine body is at an edge of the light emission range of the optical signal, and stopping controlling the machine body to move forward;
controlling the machine body to rotate along a first rotation direction so that the first sensor senses the optical signal again so as to determine that the machine body returns to the light emission range of the optical signal, and determining whether the optical signal is sensed via the second sensor;
when the second sensor senses the optical signal, stopping controlling the machine body to rotate along the first rotation direction, and determining that the one side of the machine body faces the charging station; and
controlling the machine body to move forward, so that the machine body moves toward the charging station, when a power receiving portion of the machine body is in contact with a power supply portion of the charging portion, stopping controlling the machine body to move forward.

9. The cleaning robot according to claim 8, wherein when the first sensor senses the optical signal, the operation of determining that the machine body is in the light emission range of the optical signal, and continuously controlling the machine body to move forward comprises:
when the machine body is in the light emission range of the optical signal, reducing a moving speed of the machine body.

10. The cleaning robot according to claim 8, wherein the operation of controlling the machine body to rotate along the first rotation direction so that the first sensor senses the optical signal again to determine that the machine body returns to the light emission range of the optical signal comprises:
when the first sensor stops sensing the optical signal again, determining that the machine body is at another edge of the light emission range of the optical signal, and continuously controlling the machine body to rotate along the first rotation direction so that the first sensor senses the optical signal again; and
when the first sensor senses the optical signal again, determining that the machine body returns to the light emission range of the optical signal, and continuously controlling the machine body to rotate along the first rotation direction so as to determine whether the optical signal is sensed via the second sensor.

11. The cleaning robot according to claim 8, wherein the operation of controlling the machine body to move forward so that the machine body moves toward the charging station comprises:
controlling the machine body to rotate to the right and left according to whether the second sensor stops sensing the optical signal, so that the second sensor senses the optical signal again, thereby adjusting a moving direction along which the machine body moves toward the charging station.

12. The cleaning robot according to claim 8, wherein the first sensor is an omni-directional optical sensor, and the second sensor is a directional optical sensor.

13. The cleaning robot according to claim 8, wherein the first sensor comprises a reflective structure, and the first sensor receives the optical signal reflected via the reflective structure.

14. The cleaning robot according to claim 8, wherein the blocking structure blocks a portion of a light emission range of the light emitter, so that the light emitter transmits the optical signal via another portion of the light emission range.

15. An automatic charging system, comprising:
a cleaning robot, comprising:
a processor, disposed within a machine body; and
a first sensor and a second sensor, coupled to the processor, and disposed
at a side of the machine body; and
a charging station, comprising:
a light emitter; and
a blocking structure, comprising a periodic changing structure along a transmitting direction of the light emitter; wherein
when the cleaning robot is operated in an automatic charging mode, the processor performs a plurality of operations comprising:
controlling the machine body to move forward, and determining whether an optical signal transmitted from a charging station is sensed via the first sensor,
when the first sensor senses the optical signal, determining that the machine body is in a light emission range of the optical signal, and continuously controlling the machine body to move forward;
when the first sensor stops sensing the optical signal, determining that the machine body is at an edge of the light emission range of the optical signal, and stopping controlling the machine body to move forward;
controlling the machine body to rotate along a first rotation direction so that the first sensor senses the optical signal again so as to determine that the machine body returns to the light emission range of the optical signal, and determining whether the optical signal is sensed via the second sensor;
when the second sensor senses the optical signal, stopping controlling the machine body to rotate along the first rotation direction, and determining that the one side of the machine body faces the charging station; and
controlling the machine body to move forward, so that the machine body moves toward the charging station, when a power receiving portion of the machine body is in contact with a power supply portion of the charging portion, stopping controlling the machine body to move forward.

16. The automatic charging system according to claim 15, wherein the blocking structure blocks a portion of a light emission range of the light emitter, so that the light emitter transmits the optical signal via another portion of the light emission range.

* * * * *